United States Patent
Kneer

(10) Patent No.: US 7,516,874 B2
(45) Date of Patent: Apr. 14, 2009

(54) ONE-WAY VALVE DEVICE

(75) Inventor: Roland Kneer, Farchant (DE)

(73) Assignee: Gaplast GmbH, Altenau (DE)

( * ) Notice: Subject to any disclaimer, the term of this patent is extended or adjusted under 35 U.S.C. 154(b) by 491 days.

(21) Appl. No.: 10/544,083

(22) PCT Filed: Jan. 24, 2004

(86) PCT No.: PCT/DE2004/000105

§ 371 (c)(1),
(2), (4) Date: Jul. 28, 2005

(87) PCT Pub. No.: WO2004/067400

PCT Pub. Date: Aug. 12, 2004

(65) Prior Publication Data

US 2006/0197042 A1    Sep. 7, 2006

(30) Foreign Application Priority Data

Jan. 30, 2003  (DE) ............................... 103 03 605

(51) Int. Cl.
*B65D 5/72* (2006.01)
(52) U.S. Cl. ...................... 222/497; 222/521
(58) Field of Classification Search .............. 222/212, 222/207, 20, 494, 92, 493, 491, 519, 520, 222/497; 220/707; 251/82; 137/853
See application file for complete search history.

(56) References Cited

U.S. PATENT DOCUMENTS 2,344,548 A * 3/1944 Goetz ........................... 422/28
4,449,242 A * 5/1984 Sliney, Jr. .................... 383/103
4,474,314 A * 10/1984 Roggenburg, Jr. ........... 222/494
4,506,809 A * 3/1985 Corsette ...................... 222/213
5,033,647 A * 7/1991 Smith et al. .................... 222/94
5,226,568 A * 7/1993 Newton et al. ............... 222/212
5,692,651 A * 12/1997 Fuchs ........................... 222/494
6,050,444 A * 4/2000 Sugg ........................... 220/707
6,974,053 B2 * 12/2005 Lautre et al. .................. 222/92
2002/0190079 A1 * 12/2002 Hamamoto ................. 222/105
2005/0224520 A1 * 10/2005 Janssen et al. .............. 222/190

FOREIGN PATENT DOCUMENTS

FR            2604153      *    3/1988

* cited by examiner

*Primary Examiner*—Kevin P Shaver
*Assistant Examiner*—Robert K Nichols, II
(74) *Attorney, Agent, or Firm*—Greer, Burns & Crain, Ltd.

(57) ABSTRACT

A one-way valve device comprises a valve seat arranged in the neck of a container that extends transversely across the interior of the neck and defines a plurality of passage openings. A pin-like projection is formed on the valve seat and extends axially to the exit opening. An elastic seal is held on the valve seat and comprises a sleeve-like section which surrounds the projection of the valve seat with the exception of its end section which rests on the end section of the projection. Applying pressure to the contents of the container axially displaces the sleeve-like part of the seal relative to the pin-like projection, so that the contents of the container can exit. In the closed position, an annular projection of an outer cap firmly presses the sleeve-like section of the seal against the projection of the valve seat, so that no container contents can exit.

22 Claims, 1 Drawing Sheet

ONE-WAY VALVE DEVICE

FIELD OF THE INVENTION

The present invention relates to a one-way valve device for discharging a flowable material from a container of a preferably reducible volume, comprising an outer cap which is seated on the container neck and has an exit opening for the material.

BACKGROUND OF THE INVENTION

If a container has a reducible volume, it may e.g. consist of a rigid outer container and of a flexible inner pouch which after discharge of container contents contracts each time accordingly, with pressure compensating openings being provided in the outer container for pressure compensation between the rigid outer container and the inner pouch. The container, however, may also be single-walled and e.g. have the shape of a tube which is compressed for discharging the material. Further examples of a container having a reducible volume are bellows-type containers, which gradually collapse upon discharge of the flowable material, and syringes the volume of which can be reduced by advancing a syringe plunger. It goes without saying that the above enumeration is only by way of example and not complete.

If the container is not of a reducible volume, volume compensation may also be achieved during discharge of the container contents through inflowing air which should then flow through a sterile filter.

The flowable contents of the container may be liquid and then be discharged in liquid form or as a spray, or it may be a suspension, cream, gel, ointment, or another substance, optionally of high viscosity.

A one-way valve device comprising an outer cap which is seated on the container neck and has an exit opening discharges the contents of the container in partial amounts, and the discharge in doses may be distributed over a prolonged period of time.

With many applications, it is important that the filling material remaining in the container should not be impaired by contamination, for instance by microorganisms or inorganic or organic impurities. Above all in pharmaceutical materials, but also e.g. in the case of cosmetic container contents, this determines the quality and is e.g. also applicable to flowable substances to be counted among foodstuff. That is why the material volume discharged from the container must not be compensated by (unfiltered) air entering into the container if a situation is to be prevented where bacteria, dust, moisture, oxygen etc. get into contact with the remaining contents of the container. That is why in the container of the preferred type the volume must be reduced in proportion to the amount of material discharged. It must above all be ensured that no microorganisms penetrate through the container opening and contaminate the remaining contents of the container.

Of course, it is also important to ensure that no contents of the container exits independently, for example during transportation of the container.

SUMMARY OF THE INVENTION

It is the object of the present invention to indicate a one-way valve device of the type in question in which the sterility of the flowable material remaining in the container is guaranteed, and in which it is also ensured that no contents of the container exits independently out of the container.

This object is achieved according to the invention described herein below.

Advantageous developments of the invention are characterized in the dependent claims.

The one-way valve device according to the invention includes a valve seat which consists of a rigid plastic material such as PE/PP and is arranged in the neck of the container if the container has such a neck. By contrast, when the container has, for instance, a continuous tubular shape, the valve seat is inserted in the end section of the container.

The valve seat includes a base body which extends transversely across the opening of the container neck and in this part comprises at least one passage opening that when released allows for the passage of the flowable material towards the exit opening of the container. Apart from the circular part extending transversely across the passage opening, the base body includes a section which rests on the inner wall of the container neck. Moreover, the circular part of the base body has connected thereto in its center a preferably pin-like projection preferably integrally attached to said circular part, which extends in axial direction of the container neck to the exit opening of the container.

Furthermore, the one-way valve device according to the invention includes an elastic seal which has an annular section that rests at least partly on the circular part of the base body of the valve seat and may (but need not) cover the passage opening, and a sleeve-like section integrally formed therewith, which surrounds the pin-like projection of the valve seat at a radial distance, with the exception of an end section of the sleeve-like part which in the closed state of the valve device rests on the pin-like projection. The annular section of the elastic seal is here pressed radially outside of the at least one passage opening of the valve seat against the valve seat.

Furthermore, according to the invention the outer cap is arranged to be movable between a closing position which is rearward with respect to the container and an advanced opening position and comprises an inner annular attachment which in the closing position presses the sleeve-like section of the seal into abutment with the pin-like projection.

In the one-way valve device of the invention, such a configuration guarantees the sterility of the material remaining in the container and it is moreover ensured in the closing position of the outer cap that no contents of the container can unintentionally exit, for example in an overhead position of the container, because the outer cap firmly presses the seal onto the pin-like attachment of the valve seat, thereby safely closing the flow path of the container contents to the outside. The closing position of the outer cap is preferably secured by a releasable locking engagement. It may also be that the opening position of the outer cap is detachably fixable by a locking nose, etc.

With great advantage the one-way valve includes a sterilization zone in the space between the pin-like projection of the valve seat and the sleeve-like section of the elastic seal, the sterilization means exerting a germicidal effect on possibly penetrating microorganisms, etc. Said sterilization zone may be a preferably spiral sterilization element which surrounds the projection, or it may be formed by coating at least parts of the valve seat and/or the seal with oligodynamically active metals or bactericidal substances.

It is also suggested with great advantage that an annular cavity in which a further sterilization zone is arranged should remain above the seal between the end section of the preferably pin-like projection and the outer cap surrounding the same. This sterilization zone may also be formed by coating surfaces defining the annular cavity.

In the one-way valve device according to the invention, the valve seat closes the container neck, except for its at least one passage opening. In the closed state of the valve, the elastic seal firmly rests with its annular section on the circular section of the base body of the valve seat because it is pressed in its annular outer portion into abutment with the valve seat. The elastic seal which lies flat on the base body of the valve seat preferably closes the at least one passage opening of the valve seat. However, it is also within the scope of the present invention that the seal in the area of the at least one passage opening has already passed into the sleeve-like section, i.e. in this case the seal does not close the passage opening in the inoperative state of the valve, which may be expedient in the case of a highly viscous container contents to reduce the force needed for discharging container contents.

Furthermore, the elastic seal rests in the upper end portion of its sleeve-like section tightly on the circumference of the pin-shaped projection in the closed state of the one-way valve, so that the exit path of the container contents is safely closed. It is thereby ensured that no container contents can exist, and harmful substances can thus not pass to the container contents positioned between the seal and the pin-shaped projection.

When pressure is exerted on the container contents, preferably by applying an external force on the container, the flowable material is pressed through the at least one passage opening of the valve seat against the annular section of the elastic seal, which is preferably positioned thereabove, whereby said seal is lifted from the base body of the valve seat. This is also the case when the seal is shaped such that it covers the least one passage opening at a certain distance. The passage of the container contents into the space between the pin-like projection and the sleeve-like section of the elastic seal has the consequence that the sleeve-like section moves in axial direction of the container neck and thus releases an annular passage path for the container contents between the sleeve-like section of the seal and the pin-like projection. When pressure is no longer exerted on the container contents, the seal returns into its initial position due to its elasticity. The seal which already rests as such on the pin-like projection is firmly pressed against the projection by displacement of the outer cap into the closing position and is held in said position.

The sterilization zone which is preferably arranged in the space between the seal and the valve seat may surround the projection of the valve seat in a spiral form. The dimensions should here be chosen such that the sterilization zone, which may be formed by a coated helical spring, is in contact on the upper end portion of the projection with both said projection and the sleeve-like section of the seal, so that microorganisms possibly entering into the exit opening of the container automatically pass through the sterilization element when traveling downwards. This reliably prevents microbial contamination in said area.

The sterilization zone preferably consists of silver or it includes a silver coating developing a germicidal effect. Instead of silver, other oligodynamically active metals or bactericidal substances can also be used.

Since a sterilization zone is also formed, preferably by a wall coating, above the seal between the end section of the pin-like projection and the outer cap surrounding said projection, microorganisms, etc., which have entered through the exit opening of the container, are here already efficiently combated, so that the container contents remains sterile.

Furthermore, with great advantage the one-way valve device according to the invention includes an annular inner cap below the outer cap, said inner cap being fixed to the container neck and gripping over said neck with an outer annular wall and an inner annular wall. Said inner cap is preferably secured to the container neck by the inner cap gripping with an inner annular projection of its outer wall under a surrounding projection protruding externally on the container neck, the arrangement being chosen such that the annular inner cap is non-rotatably seated on the container neck.

Furthermore, it is suggested that the outer annular wall of the inner cap should comprise an external thread which is in engagement with an internal thread of an opposite annular wall of the outer cap. The outer cap is thereby rotatable relative to the remaining components of the one-way valve device, and the area of rotation should here be defined by stops. For instance, the outer cap may be moved by half a rotation from the closing position into the opening position.

Due to the rotation into the opening position, the outer cap is advanced in the axial direction of the container, the inner annular attachment of the outer cap releasing the press fit of the sleeve-like section of the seal. At the same time, viewed relatively, the end section of the pin-like projection exits from the exit opening of the outer cap, and upon exertion of pressure on the container contents the sleeve-like section of the seal can be displaced in axial direction (in the illustration of FIGS. 1 and 2 upwards). As a result, the container contents can pass between and through the pin-like projection and the sleeve-like section of the seal and leave the container through the exit opening of the outer cap that is now free.

In further details, it is suggested that the pin-like projection should have an axial section tapering towards the free end, against which the sleeve-like section of the seal can be pressed through the inner annular attachment of the outer cap. Viewed in cross section, the inner annular attachment of the outer cap should comprise a wall section expanding obliquely downwards, which cooperates with the tapering axial section of the projection. The annular attachment of the outer cap can be supported in the closing state radially outside on the inner annular wall of the inner cap, resulting in a high closing force.

The base body of the valve seat contains, expediently radially outside the projection, a plurality of through holes for the passage of the container contents.

The projection molded in the center of the circular planar base plate of the base body preferably includes a circular cylindrical section, an adjoining tapering, preferably conically beveled section, and then again an adjoining end section of a circular cylindrical shape, whose upper edge is arranged inside the container opening of the outer cap, preferably in alignment with the upper side thereof.

The annular section of the seal has a planar shape and is held by an inner annular wall of the inner cap radially outside the at least one passage opening in contact with the base plate of the valve seat.

In a further variant of the invention, the sleeve-like section of the seal in longitudinal section starting from the annular section first comprises a conically tapering section, then a cylindrical section and then again a conically or arcuately tapering section which on its outside ends again in a cylindrical section. The sleeve-like section is pressed in the area of its upper conically or arcuately tapering section against the pin-like projection when the outer cap is in the closing position.

BRIEF DESCRIPTION OF THE DRAWINGS

Further details of the invention become apparent from the following description of a preferred embodiment and from the drawing, in which.

DETAILED DESCRIPTION OF A PREFERRED EMBODIMENT

Figure 1:
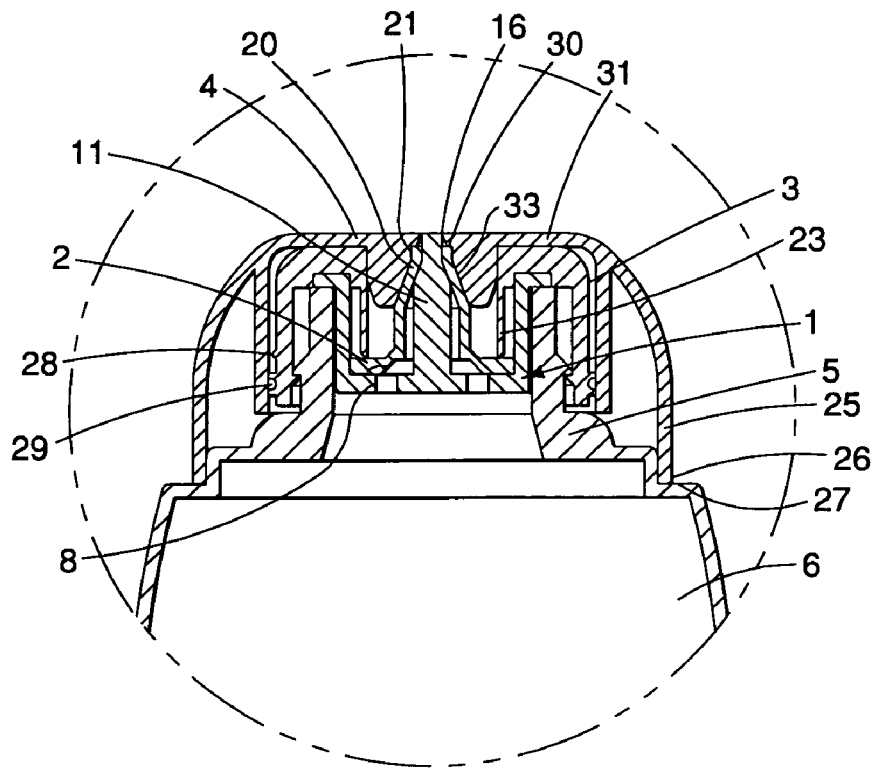
FIG. 1 is a vertical section through the upper end portion of a container provided with an embodiment of the one-way valve device, in the closed state of the system.

The one-way valve device according to the invention includes a valve seat 1 inserted into the neck 5 of a container 6, an elastic seal 2, an inner cap 3 and an outer cap 4.

The valve seat 1 consists of a planar circular base plate 7 through which a plurality of circumferentially evenly spaced-apart passage openings 8 extend, of an outwardly adjoining cylindrical circumferential wall 9 which tightly rests on the inner wall of the container neck 5 and ends in an outwardly oriented annular collar 10 resting on the upper edge of the container neck 5.

In the center of the circular base plate 7, a pin-like or peg-like projection 11 is molded that projects from the base plate 7 at a right angle and, extending therefrom, has a circular cylindrical section 12 which passes into a section 13 which is tapered upwards in the form of a truncated cone and which is joined by an end section 14 which has a circular cylindrical form again. In the closed state of the system, the end section 14 projects into a central exit opening 16 of the container cap 4 and its upper side ends flush with the upper side of the outer cap 4. In the opened system, the outer cap 4 is shifted upwards in the illustration of FIG. 2, so that the exit opening 16 of the outer cap 4 is exposed.

Like the valve seat 1, the seal 2, which consists of an elastic plastic material, is also produced in one piece and includes a planar annular section 17 which on its radial inner circumferential edge passes into a sleeve-like section whose central longitudinal axis extends in a direction perpendicular to the plane of the annular section 17. Starting from the annular section 17, the sleeve-like section consists of a first conically upwardly tapering section 18, an adjoining circular cylindrical section 19, then again of an adjoining, conically or arcuately tapering section 20 and of an end section 21 whose outer wall is again shaped as a circular cylinder. The tapering section 20 may loosely rest on the section 13 of the pin-like projection 11 in the opened system and is firmly pressed against said section in the closed system.

The inner cap 3 includes an outer annular wall 22 which with an internally surrounding projection grips under an outer projection of the container neck 5, and an inner annular wall 23 engaging into the container neck 5, which presses the annular section 17 of the seal 2 firmly against the valve seat, namely radially outside the passage openings 8. The outer annular wall 22 is provided with an external thread 24.

Figure 2:
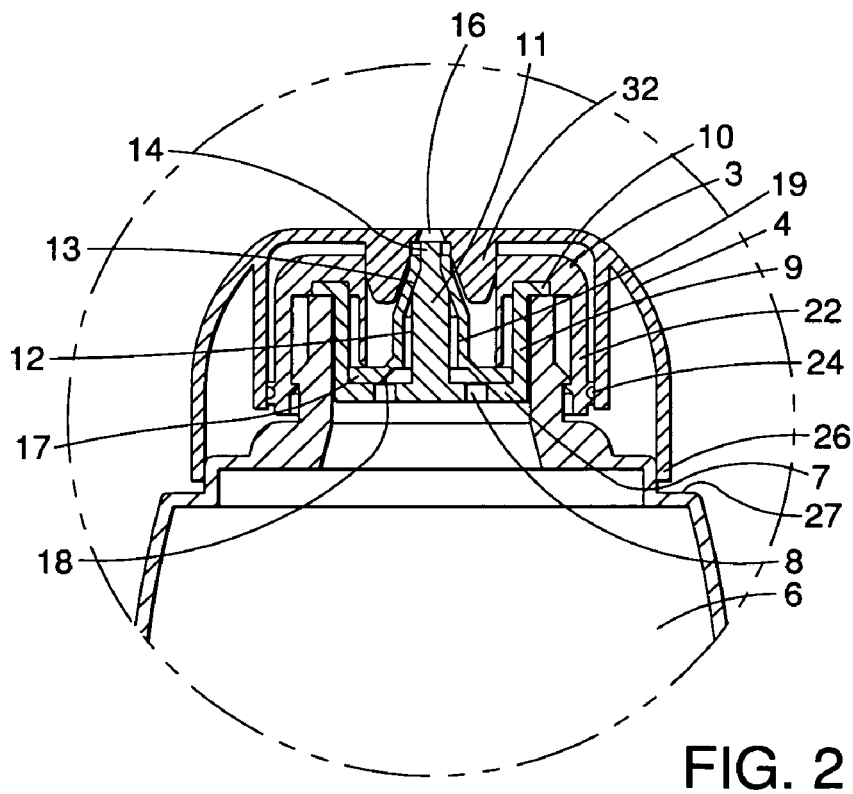
FIG. 2 is an illustration according to FIG. 1 in the opened state of the system.

The outer cap 4 includes an outer wall 25 which is approximately bell-shaped on the whole and which rests with its front edge 26, which is the lower one in the figures, on a shoulder 27 of the container 6 in the closed state of the system. Radially inside the bell-shaped circumferential wall 25, the outer cap 4 includes an annular wall 28 which engages with an internal thread 29 into the thread 24 of the inner cap. The outer cap 4 is thus rotatably arranged on the container neck and can be displaced by a corresponding rotation upwards into the opening position, as shown in FIG. 2. In the opened state, the edge 26 is spaced apart from the shoulder 27, and the conically upwardly tapering exit opening 16 is exposed.

A cavity 30, the boundary walls of which may be coated with a sterilizing material, remains above the front edge of the seal 2.

The bottom side of the upper wall 31 of the outer cap 4 has formed thereon a downwardly projecting annular projection 32 which with an inclined inner wall 33 and in the closed state of the system presses the section 20 of the seal 2 (or part thereof) firmly against the section 13 of the projection 11, so that the contents of the container cannot exit out of the container or the exit opening 16.

In the annular space between the pin-like projection 11 of the valve seat and the section of the seal 2, which is sleeve-shaped on the whole, a sterilization element provided with a silver coating may be arranged in the form of a spiral screw which surrounds the projection 11 at a small distance.

When pressurized filling material of the container 6 or filling material subjected to pressure is pressed through the passage openings 8 of the valve seat 1, the radially inner portion of the seal 2 is lifted upwards, i.e. the whole sleeve-like section of the seal 1 travels upwards, and filling material passes between and through the seal 1 and the pin-like projection 11 and exits out of the exit opening 16. When pressure is no longer exerted on the contents of the container, the sealing element 2 will return automatically on account of the elasticity of its material into the initial position in which it rests on the pin-like projection 11 in the upper area thereof.

The invention claimed is:

1. A one-way device for discharging a flowable material from a container of a reducible volume comprising an outer cap which includes an exit opening for the material, said one-way device comprising:

a valve seat arranged in a neck of the container and comprising a base body which extends transversely across the opening of the container neck and rests on the inner wall of the container neck and includes at least one passage opening, and a projection which extends in axial direction of the container neck towards the exit opening;

an elastic seal which comprises an annular section resting on the base body, and a sleeve-like section which surrounds the projection at a radial distance where in the closed state, the one-way valve device rests on the projection; and an annular inner cap secured to the container neck and grips over said neck with an outer annular wall and an inner annular wall, the outer cap being arranged to be movable between a rearward closing position and an advanced opening position, and comprising an inner annular attachment which in the closing position presses the sleeve-like section of the seal into abutment with the projection.

2. The one-way valve device according to claim 1, wherein the outer annular wall of the inner cap comprises an external thread which is in engagement with an internal thread of an annular wall of the outer cap.

3. The one-way valve device according to claim 2, wherein the inner cap and/or the outer cap have formed thereon stops by which the range of rotation of the outer cap is limited.

4. The one-way valve device according to claim 1, wherein the inner annular wall of the inner cap presses the annular section of the seal against the base body of the valve seat.

5. The one-way valve device according to claim 1, wherein the projection comprises an axial section tapering towards the free end thereof, against which the sleeve-like section of the seal can be pressed by the inner attachment of the outer cap.

6. The one-way valve device according to claim 5, wherein the inner annular attachment of the outer cap comprises an obliquely downwardly expanding wall section which cooperates with the tapering axial section of the projection.

7. The one-way valve device according to claim 1, wherein a cavity remains above the seal between the end section of the projection and the outer cap surrounding said projection.

8. The one-way valve device according to claim 7, wherein a sterilization zone is arranged in the cavity.

9. The one-way valve device according to claim 1, wherein a further sterilization zone is arranged between the valve seat and the seal.

10. The one-way valve device according to claim 1, wherein the base body of the valve seat includes a plurality of through holes radially outside the projection.

11. The one-way valve device according to claim 1, wherein the base body of the valve device includes a planar base plate which passes into a circumferential wall which rests on the inner wall of the container neck and which rests with an outwardly surrounding shoulder on the edge of the container neck.

12. The one-way valve device according to claim 1, wherein the projection of the valve seat has a circular cylindrical section, an adjoining tapering, preferably conically beveled section, and an adjoining circular cylindrical end section.

13. The one-way valve device according to claim 1, wherein the projection of the valve seat in longitudinal section has an arcuate contour at least in part.

14. The one-way valve device according to claim 1, wherein the upper edge of the projection is arranged in the closed state of the valve inside the container opening.

15. The one-way valve device according to claim 1, wherein, the annular section of the seal has a planar shape and is held by the inner annular wall of the inner cap radially outside the passage openings in contact with the valve seat.

16. The one-way valve device according to claim 1, wherein the sleeve-like section of the seal in longitudinal section starting from the annular section, is first given a conically tapering shape, then a cylindrical shape, then again a conically tapering shape and is made cylindrical on the outside thereof.

17. The one-way valve device according to claim 1, wherein the sleeve-like section of the seal in longitudinal section has an arcuate contour.

18. The one-way valve device according to claim 1, wherein the upper edge of the projection of the valve seat is in alignment with the upper side of the outer cap in the closed state of the valve.

19. The one-way valve device according to claim 1, wherein at least one sterilization zone includes a spiral sterilization element which surrounds the projection.

20. The one-way valve device according to claim 19, wherein the sterilization zone in the closed state of the valve is in contact on an upper end portion of both the projection and the sleeve-like section of the seal.

21. The one-way valve device according to claim 1, wherein the sterilization zone consists of silver or of another oligodynamically active metal or bactericidal substance or is coated therewith.

22. The one-way valve device according to claim 1, wherein at least one sterilization zone is formed by coating at least parts of the valve seat and/or the seat and/or the outer cap with oligodynamically active metals or bactericidal substances.

* * * * *